United States Patent [19]

Vinokurov et al.

[11] 4,250,744
[45] Feb. 17, 1981

[54] DEVICE FOR CHECKING AN ELECTRICAL MACHINE COOLING SYSTEM

[76] Inventors: Alexandr A. Vinokurov, ulitsa Serdjukova, 6, kv. 58, Novosibirsk; Alexandr V. Zhukovsky, Naberezhnaya Chernoi Rechki, 12, kv. 69, Leningrad; Igor L. Zotov, ulitsa Rogova, 2, kv. 86, Moscow; Jury S. Popov, ulitsa Bariernaya, 16, kv. 14, Novosibirsk; Iosif F. Filippov, ulitsa Pulkovskaya, 17, kv. 39, Leningrad; Vladimir N. Ponedelko, ulitsa Serdjukova, 6, kv. 57, Novosibirsk, all of U.S.S.R.

[21] Appl. No.: 33,476

[22] Filed: Apr. 26, 1979

[30] Foreign Application Priority Data

Apr. 27, 1978 [SU] U.S.S.R. .................. 2603801

[51] Int. Cl.³ ........................... G01M 19/00
[52] U.S. Cl. ................................. 73/118
[58] Field of Search ................ 73/118, 432 SD; 174/15 CA; 62/125

[56] References Cited

U.S. PATENT DOCUMENTS 3,133,144  5/1964  Cottingham et al. .......... 174/15 CA
3,909,225  9/1975  Rooney ....................... 174/15 CA X Primary Examiner—Jerry W. Myracle
Attorney, Agent, or Firm—Lackenbach, Lilling & Siegel

[57] ABSTRACT

The invention relates to devices for checking the conditions of the coolant at the output of the coolant feed unit of an electrical machine with cryogenic cooling.

The device for checking the condition of the coolant comprises a hollow rotor, in which cryogenic temperature is maintained. Located inside the hollow rotor at one end and coaxially with the rotor is a coolant feed unit having a stationary part made in the form of two coaxial tubes disposed with a gap with respect to each other and a movable part. One end of the coolant feed unit communicates with a coolant supply tank while the other end communicates with a coolant collecting chamber, which, in turn, communicates with a unit for transferring the coolant into a liquid coolant receiver tank disposed at the other end of the hollow rotor and made, identically to the unit, in the form of two coaxial tubes. Provided at the ends of the hollow rotor are at least two chambers for transferring the gaseous coolant, one of which communicates with the movable part of the unit and the other one communicates with the coolant collecting chamber. The coolant supply and receiver tanks have a device for measuring the quantity of liquid coolant.

The invention is used for determining the quantitative proportion of the liquid and gaseous phases of the coolant of an electrical machine with cryogenic cooling.

2 Claims, 2 Drawing Figures

DEVICE FOR CHECKING AN ELECTRICAL MACHINE COOLING SYSTEM

FIELD OF THE INVENTION

The present invention relates to cryogenic engineering and, more particularly, the invention relates to devices for checking the condition of the coolant of an electrical machine with cryogenic cooling at the output of the coolant feed unit.

The present device for checking the condition of the coolant at the output of the coolant feed unit of an electrical machine with cryogenic cooling is used for testing the coolant feed unit to quantitatively determine the proportion of the liquid and gas phases of the coolant before feeding it to the superconducting field winding of the electrical machine. It can also be used for studying cryogenic liquids, such as nitrogen and helium, under the action of centrifugal forces.

BACKGROUND OF THE INVENTION

Liquid helium at a temperature of 4.2° K. is usually used as a cooling agent in electrical machines with cryogenic cooling. The coolant feed unit, which is used for supplying the liquid coolant from a stationary tank to the rotary superconducting field winding of the electrical machine, is an important component of such a machine. A distinctive feature of liquid helium supply is the appearance of a two-phase flow due to evaporation of a portion of helium caused by the frictional of the flow of liquid helium about the rotating parts of the electrical machine and the local hydraulic losses of the helium flow.

The quantitative proportion of the liquid and gas phases of the coolant, i.e. the efficiency of the cooling of the superconducting field winding determining the output power and efficiency of the entire electrical machine, depends on the design and operating conditions (flow rate, pressure, temperature of the cooling agent) of the cooling agent feed unit. An insufficiently effective cooling film can cause boiling conditions to be established in the cooling channels of the superconducting field winding, and this results in a loss of superconducting properties of the superconductor.

Known in the art is a device for checking the condition of the coolant at the output of a coolant circuit of an electrical machine with cryogenic cooling (cf. P.A.Rios, B.B.Gamble and E.T.Lascaris. Development of a Coolant Circuit for Rotors of Superconducting generators. Conference on Technical Application of Superconductivity. Alushta, USSR, September 16–19, General Electric) having a stationary part made of two coaxial tubes arranged with a gap with respect to each other and a movable part comprising a hollow rotor, in which a cryogenic temperature is maintained and having at one end, coaxially with the hollow rotor, a coolant feed unit of the machine whose stationary portion communicates through one end with a coolant feed tank, while the movable portion communicates with a coolant collecting chamber and a coolant removing unit for feeding the coolant into the coolant receiver tank, said chamber and unit being arranged inside the hollow rotor.

This device is a model of an electrical machine with cryogenic cooling and it comprises all basic elements of such an electrical machine, therefore, it features a complex design. The coolant removing unit also has a complex design. The coolant is removed from the chamber for collecting the coolant through passages disposed in the shell and bottoms of these chambers, in a thermal shield, inside the shaft. The coolant condition in the collecting chamber is monitored by the level of the liquid phase of the coolant, and this requires the use of a current-collecting member in the model, which complicates its construction, because one end of the rotor is coupled to a drive and the other end carries a coolant feed unit and has passages for removing the coolant from the coolant collecting chamber.

The basic object of the invention is to provide a device for checking the condition of the coolant at the output of the coolant feed unit of an electrical machine with cryogenic cooling whose design makes it possible to simplify the measurement of the proportion of the liquid and gaseous phases of the coolant at the feed unit output.

BRIEF DESCRIPTION OF THE INVENTION

An object of the present invention is to simplify the design of the device for checking the condition of the coolant at the output of a coolant feed unit of an electrical machine with cryogenic cooling.

The essence of the invention resides in the device for checking the condition of the coolant at the coolant feed unit having a stationary part made in the form of two coaxial tubes arranged one inside the other with a gap therebetween and a movable part, comprising a hollow rotor, in which cryogenic temperature is maintained, said rotor accommodating at one end a coolant feed unit of the electrical machine; said unit has a stationary part communicating with the coolant supply tank and a movable part having a coolant collecting chamber communicating with a unit for transferring the coolant into a coolant receiver tank, said chamber and unit being arranged inside the hollow rotor. In accordance with the invention, the coolant transfer unit is disposed at the other end of the hollow rotor and is provided with a movable portion rigidly connected to the hollow rotor and is also provided with a stationary portion made identical to the stationary part of the coolant feed unit in the form of two coaxially disposed tubes arranged with a gap therebetween. The end of the central tube is located inside the coolant collecting chamber and has an intake member. At least two chambers are disposed in vacuum-tight housings and used for removing the gaseous coolant, said chambers being disposed at both ends of the hollow rotor and one of them communicating with the movable part of the coolant feed unit through the gap between the tubes of the stationary portion of the coolant feed unit and the other chamber communicating with the coolant collecting chamber through the gap between the tubes of the stationary part of the coolant transfer unit. The coolant supply tank and coolant receiver tank are connected with respective means for measuring the quantity of liquid coolant.

In order to reduce the loss of liquid coolant due to evaporation in the device for checking the condition of the coolant in an electrical machine with cryogenic cooling at the output of the coolant feed unit, according to the invention, the intake member is preferably made in the form of a bent pipe whose inlet is placed in the immediate vicinity of the wall of the coolant collecting chamber and opposing the coolant flow.

This design of the device makes it possible to simplify the process of measurement of the proportion of the liquid and gaseous phases of the coolant at the output of the coolant feed unit and to simplify the construction of the whole device for checking the condition of the coolant.

Other objects and advantages of the invention will be clear from the following detailed description of the invention.

BRIEF DESCRIPTION OF THE DRAWINGS

The essence of the invention is clearly understood from the appended drawings, in which.

DETAILED DESCRIPTION OF THE INVENTION

Figures 1, 2:
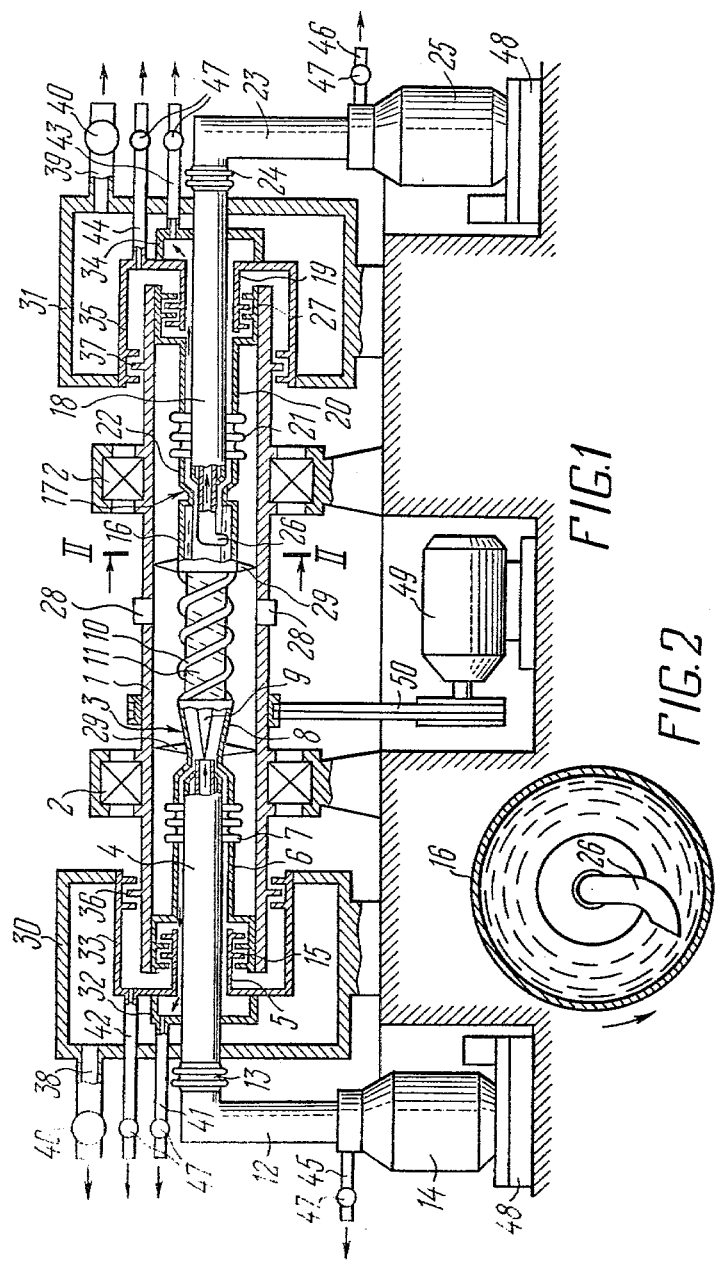
FIG. 1 is a longitudinal section of the proposed device for checking the condition of the coolant at the output of the coolant feed unit of an electrical machine with cryogenic cooling, according to the invention.
FIG. 2 is a sectional view along the line I—I in FIG. 1 in an enlarged scale showing the disposition of the intake member in the coolant collecting chamber.

The proposed device comprises a hermetically sealed hollow rotor 1 (FIG. 1) having means for maintaining cryogenic temperature inside the rotor. The hollow rotor 1 is mounted in bearings 2. Mounted inside the hollow rotor 1 coaxially therewith at one end of the rotor is a coolant feed unit 3 to be checked consisting of a stationary part made of coaxially arranged tubes: a central tube 4 and a female tube 5. The coolant feed unit has a movable part rigidly connected to the hollow rotor 1 and consisting of a thin-walled tube 6 whose diameter is equal to that of the tube 5, bellows 7, a receiving chamber 8, a needle 9, passages 10 for feeding the coolant to the superconducting field winding of the electrical machine arranged along a helical line on a supporting member 11. The central tube 4 of the stationary part of the coolant feed unit 3 is vacuum-tight and through a cryogenic pipeline 12 with a flexible element 13 is connected to a coolant supply tank 14 made as a Dewar flask. Liquid helium at a temperature 4.2° K. is used as a coolant. The other end of the central tube 4 is connected to the receiving chamber 8 of the coolant feed unit 3. The thin-walled tube 6, bellows 7 and a part of the receiving chamber 8 envelop the central tube 4 forming a uniform annular gap. A conventional sealing means 15 is provided in the gap between the tube 5 and the wall of the hollow rotor 1 to prevent leakage of gaseous helium. The coolant feed unit 3 adjoins the coolant collecting chamber 16 whose one end is rigidly connected to the supporting member 11 and passages 10.

Located at the other end of the hollow rotor 1 is a coolant transfer unit 17 comprising a stationary portion, made of coaxial tubes 18 and 19 arranged along the rotor axis with a gap, and a movable portion comprising a thin-walled tube 20 and bellows 21. All these members of the coolant transfer unit 17 are made similarly to those of the coolant feed unit 3. The movable portion of the coolant transfer unit 17 through the thin-walled tube 20 is rigidly connected through one end to the walls of the hollow rotor 1 while the other end is connected to the coolant collecting chamber 16 through a neck 22. One end of the central tube 18 of the stationary portion of the coolant transfer unit 17 is connected to a coolant receiver tank 25 through a cryogenic pipeline 23 having a flexible member 24. The tank 25 is a Dewar flask. The other end of the central tube 18 is located within the coolant collecting chamber 16 and is equipped with an intake member 26 for shockless transfer of the rotating liquid into the stationary central tube 18. Provided between the tube 19 of the stationary portion of the coolant transfer unit 17 and the wall of the hollow rotor 1 is a sealing means 27 similar to the seal 15.

In order to keep cryogenic temperature inside the rotor 1, its space is evacuated to a pressure of $1.3 \cdot 10^{-3}$ Pa. For this purpose, the rotor 1 is equipped with two evacuating valves 28. In order to reduce the radiative heat transfer, the tubes 6, 20, receiving chamber 8, supporting member 11 with passages 10, coolant collecting chamber 16, and neck 22 are coated with superinsulation, e.g. in the form of a thin moire film (not shown) laid in several layers.

The movable part of the coolant feed unit 3 is secured inside the hollow rotor 1 by means of supports 29 having low thermal conductivity.

At both ends the hollow rotor 1 is enveloped by vacuum-tight housings 30 and 31 having at least two chambers for removing gaseous coolant. In the proposed device four such chambers are provided. At one end the vacuum-tight housing 30 has adjoining chambers 32 and 33. The chamber 32 communicates with the receiving chamber 8 through an annular gap formed by the central tube 4 with the tube 5, a thin-walled tube 6, bellows 7 and a part of the receiving chamber 8. The chamber 33 is intended for collecting the leaks through the seal 15 and also communicates with the receiving chamber 8 of the coolant feed unit 3 through this seal 15 and the gap formed by the tubes 4,6, bellows 7 and a part of the chamber 8. At the other end of the rotor 1 in the vacuum-tight housing 31 there are provided chambers 34 and 35 similar to the chambers 32 and 33. The chamber 34 communicates with the coolant collecting chamber 26 through an annular gap formed by the central tube 18 with the tube 19, the thin-walled tube 20, bellows 21 and neck 22. The chamber 35 is used for collecting the leaks through the seal 27 and communicates with the coolant collecting chamber through the seal 27 and said annular gap. Provided between the chambers 33 and 35 and the ends of the hollow rotor 1 are respectively seals 36 and 37 to prevent leakage of gaseous helium into the ambient medium. These seals are of an ordinary type known in the art.

The vacuum-tight housings 30 and 31 are required for accurate measurement of the heat penetrating to the liquid coolant. Since there is no heat transfer from the parts of the rotor 1 encompassed by the vacuum-tight housings 30 and 31, the heat penetrates only by thermal bridges and it can easily be found if the temperature at the ends of the thermal bridges is known.

The vacuum-tight housings 30 and 31 are provided with branch pipes 38 and 39 with valves 40 for connection with vacuum pumps (not shown). The chambers 32, 33, 34, 35, as well as the coolant supply tank 14 and coolant receiver tank 25 are provided respectively with branch pipes 41, 42, 43, 44, 45, 46 with valves 47, each of which is connected to a corresponding instrument for measuring the flow rate, pressure, temperature of the gaseous coolant (not shown).

In order to measure the quantity of liquid coolant, the tanks 14 and 25 for supply and reception of coolant are connected with respective means for measuring the coolant quantity. It is expedient to use balance mechanisms 48 as means for measuring the quantity of coolant. These measurements may be also conducted using the volumetric method.

The hollow rotor 1 is rotated by an electric motor 49 whose speed can be controlled by means of a V-belt transmission 50.

The arrows in FIG. 1 show the direction of movement of the coolant.

FIG. 2 shows the intake member 26 made in the form of a bent branch pipe whose inlet is located in the immediate vicinity of the wall of the coolant collecting chamber 16 and opposes the direction of rotation of the hollow rotor 1. The arrow in FIG. 2 shows the direction of rotation of the hollow rotor 1.

The monitoring of the condition of the coolant of an electrical machine with cryogenic cooling at the output of the coolant feed unit 3 is effected as follows.

The coolant (liquid helium at 4.2° K.) from the coolant supply tank 14 (FIG. 1) through the cryogenic pipeline 12 and central tube 4 of the coolant feed unit 3 is supplied into the rotating receiver chamber 8, where it is twisted by the needle 9 and thrown onto the walls of the chamber 8. In the rotating receiver chamber 8 the coolant phases are separated; the liquid phase forms an annular layer at the walls of the chamber 8, while the gaseous coolant formed due to evaporation fills the central part of the chamber 8. The liquid coolant is fed into the coolant collecting chamber through the passages 10, while the gaseous coolant is fed through the gap between the central tube 4 and the bellows 7, the thin-walled tube 6 and the tube 5 into the coolant transfer chamber 32, from which it is applied to the measuring instruments through the pipe 41. The motion of the flow of gaseous coolant along the annular gap prevents penetration of heat to the liquid coolant through the twin-walled tube 6 and central tube 4. The coolant passed through the seal 15 is fed into the leakage collecting chamber 33 and is also fed to the measuring instruments through the branch pipe 42.

Having passed through the coolant feed unit 3, the coolant enters the coolant collecting chamber 16, where it is also separated into a liquid and a gaseous phase. The gaseous coolant through the respective annular gap enters the chamber 34 for removing the gaseous coolant and the chamber 35 for collecting the leaks, from which the coolant is fed through the branch pipes 43 and 44 to the corresponding measuring instruments. The liquid coolant forms a rotating annular layer in the coolant collecting chamber 16, is trapped by the intake members 26 (FIGS. 1,2), the inlet of which is directed opposite to the incoming flow of liquid coolant. From the intake member 26 the coolant is fed into the central tube 18 (FIG. 1) of the coolant transfer unit 17 and then is fed into the coolant receiver tank 25 through the cryogenic pipeline 23. The motion of liquid in the line: central tube 18—cryogenic pipeline 23 takes place due to the pressure drop in the coolant collecting chamber 16 and in the coolant receiver tank 25 and due to the utilization of the dynamic head of the rotating coolant flow in the chamber 16 by means of the intake member 26. The liquid pressure in the coolant collecting chamber 16 is provided due to the action of the centrifugal forces.

The proposed design of the coolant transfer unit 17 makes it possible to separately remove the gaseous and liquid phases of the coolant for measuring their quantitative proportion at the output of the coolant feed unit 3. The quantity of liquid coolant in the tanks 14 and 25 for supply and reception of the coolant is determined by means of the balance 48. The quantity of gaseous coolant produced due to the evaporation in the coolant collecting chamber 16, the receiving chamber 8 and the tanks 14 and 25 is measured by means of corresponding instruments, e.g. gas counters connected to the branch pipes 41, 42, 43, 44, 45, 46.

Knowing these values and measuring the temperature, e.g. by means of thermocouples (not shown), of the stationary elements of the device, one may have an impression of the processes occurring in the coolant feed unit 3 of the electrical machine. By changing the pressure in the chambers 32 and 34 for removing the coolant, in the tanks 14 and 25 for supply and reception of the coolant and changing the speed of the hollow rotor 1, it is possible to simulate various operating conditions of the tested coolant feed unit 3 of the electrical machine with cryogenic cooling.

The proposed device makes it possible to easily measure with sufficient accuracy the proportion of the liquid and gaseous phases at the output of the coolant feed unit of an electrical machine with cryogenic cooling and to select the optimum design of the feed unit and its operating conditions before mounting it into an electrical machine, and this assists in more reasonable and efficient cooling of the superconducting field winding of an electrical machine. The device is simple in servicing and more economical compared to the known devices of this type.

What is claimed is:

1. A device for monitoring the condition of the coolant of an electrical machine with cryogenic cooling at the output of a coolant feed unit having a stationary part made in the form of two coaxial tubes arranged one inside the other with a gap therebetween and a movable part comprising:

a hollow rotor having two ends, inside of which cryogenic temperature is maintained;

said coolant feed unit mounted inside said hollow rotor at one end thereof and coaxially therewith, said movable part being rigidly connected to said hollow rotor;

a coolant supply tank communicating with said stationary part of said coolant feed unit;

a coolant collecting chamber arranged inside said hollow rotor and connected to said movable part of said coolant feed unit;

a central tube of said coaxial tubes of said stationary part of said coolant feed unit mounted along the axis of said hollow rotor and communicating said coolant supply chamber with said movable part of said coolant feed unit;

a coolant transfer unit arranged inside said hollow rotor at its other end; a stationary portion of said coolant feed unit made identically to said stationary part of said coolant feed unit in the form of two coaxial tubes installed with a gap therebetween; a central tubes of said coaxial tubes whose one end is placed in said coolant collecting chamber;

a coolant receiver tank communicating with said stationary portion of said coolant transfer unit;

an intake member mounted on said end of said central tube of said coolant transfer unit;

at least two coolant transfer chambers for removing the gaseous coolant, each chamber being located at one of said ends of said hollow rotor; one said chamber communicating through said gap between said tubes of said coolant feed unit with said movable part of said coolant feed unit and the other chamber communicating through said gap between said tubes of said coolant feed unit with said coolant collecting chamber;

vacuum-tight housing of said chambers for removing the gaseous coolant;

means for measuring the quantity of liquid coolant connected respectively to said coolant supply tank and said coolant receiver tank.

2. A device for checking the condition the coolant of an electrical machine with cryogenic cooling at the output of a coolant feed unit according to claim 1, comprising:

said intake member made in the form of a bent branch pipe having an inlet disposed in the immediate vicinity to the walls of said coolant collecting chamber and facing the incoming flow of coolant.

* * * * *